June 9, 1925. 1,541,021
A. BACHLE
COMBINATION GEAR AND IGNITION SWITCH LOCK
Filed June 25, 1923
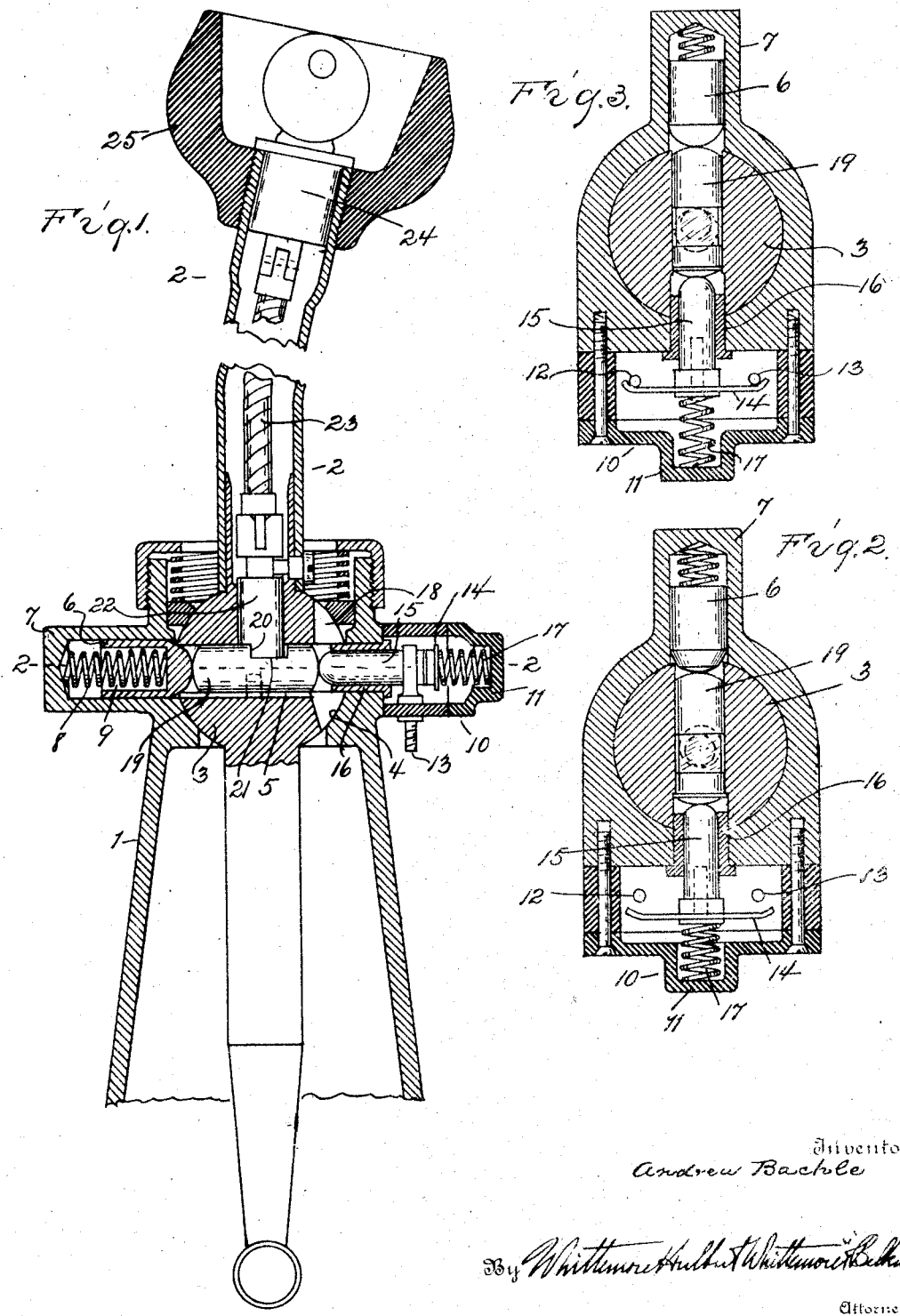
Inventor
Andrew Bachle Patented June 9, 1925.

1,541,021

UNITED STATES PATENT OFFICE.

ANDREW BACHLE, OF DETROIT, MICHIGAN.

COMBINATION GEAR AND IGNITION SWITCH LOCK.

Application filed June 25, 1923. Serial No. 647,737.

*To all whom it may concern:*

Be it known that I, ANDREW BACHLE, a citizen of the United States of America, residing at Detroit, in the county of Wayne and State of Michigan, have invented certain new and useful Improvements in Combination Gear and Ignition Switch Locks, of which the following is a specification, reference being had therein to the accompanying drawings.

The invention relates to combination gear and ignition switch locks and is particularly applicable to motor vehicles for locking the shift lever controlling the change speed gearing and also breaking the ignition circuit. One of the objects of the invention is the provision of a reciprocable plunger for locking the gear shift lever, a reciprocable plunger controlling the opening and closing of the ignition circuit, and a reciprocable pin carried by the shift lever and engageable with the plungers for alternatively actuating the same.

Another object is the provision of a lever having a spherical bearing member with a transverse opening therein, a support having a spherical socket engageable in by the spherical bearing member, a spring pressed plunger engageable in the transverse opening for locking the lever, an electric switch including a spring pressed plunger also engageable in the transverse opening, and a reciprocable pin in the transverse opening and engageable with the plungers for alternatively actuating the same.

Further objects of the invention reside in the novel features of construction and combinations and arrangements of parts as more fully hereinafter set forth.

In the drawings:

Figure 1 is a central vertical section partly in elevation through a construction embodying my invention;

Figure 2 is a cross section on the line 2—2 of Figure 1;

Figure 3 is a similar view showing the parts in different position of adjustment.

1 is the upwardly extending support upon the cover of the change speed gearing housing and 2 is the hand operated shift lever mounted upon the support 1 and adapted to actuate the reciprocable shifter rods of the change speed gearing in the usual manner. The shift lever is provided with the spherical bearing member 3 mounted in the spherical socket 4 of the support.

5 is a transverse diametrically extending opening in the spherical bearing member 3 and extending parallel to the shifter rods. 6 is a reciprocable plunger engageable in the forward end of the opening 5 to lock the shift lever whereby it is held from actuating the shifter rods. This plunger is slidably mounted in the boss 7 at the front of the support 1 and is yieldably forced into the opening 5 by the coil spring 8 which extends into the recess 9 formed in the plunger.

10 is the electric switch controlling the ignition circuit of the motor vehicle engine. This switch is inclosed within the housing 11, which is preferably formed of insulating material and is secured to the rear side of the support 1. 12 and 13 are terminals of the switch adapted to be electrically connected by the bridge 14 formed of a flat spring adapted to contact therewith. This bridge is secured to the reciprocable plunger 15 slidably mounted in the bushing 16, which is carried upon the support 1, and engageable in the rear end of the transverse opening 5 in the spherical bearing member 3. The coil spring 17 yieldably forces the plunger 15 into the transverse opening in the spherical bearing member, the arrangement being such that when the plunger is located in the rear end of the transverse opening, the terminals 12 and 13 are electrically connected by the bridge 14 and the ignition circuit is made. To permit of the necessary rocking movement of the shift lever 2 when the plunger 15 is in engagement with the rear end of the transverse opening in the spherical bearing member of the shift lever the rear end of the transverse opening is enlarged vertically at 18 as by forming a slot in the spherical bearing member.

For the purpose of automatically breaking the ignition circuit and locking the shift lever and for the purpose of unlocking the shift lever and automatically making the ignition circuit, I have provided the reciprocable pin 19 in the transverse opening 5 and between the plungers 6 and 15, this pin having rounded ends and having in its upper surface the slot 20 engageable in by the eccentric or cam portion 21 of the operating cam 22 which is rotatable to reciprocate the pin 19 in opposite directions to alternatively actuate the plungers. The pin 19 is held from rotation in the transverse opening preferably by a key. For the purpose of rotating the cam 22 the shift lever 2 is made tubular to receive the flexible cable 23 connected at its lower end to the cam and at its upper end to the actuating mechanism of the cylinder lock 24 which is operated by a key. This cylinder lock is mounted concentrically in the enlargement 25 at the upper end of the shift lever and forming the hand grip thereof.

From the above description it will be seen that I have provided a self-contained locking unit for simultaneously holding the shift lever from actuating the shifter rods and also holding open the electric switch in the ignition circuit. Furthermore, that the electric switch is allowed to close at the time of unlocking the shift lever.

What I claim as my invention is:

1. The combination with a lever provided with a spherical bearing member, of a support for said member provided with a socket for receiving said spherical bearing member, means upon one side of said support engageable with said spherical bearing member for locking the same, an electric switch upon the opposite side of said support, and a common member upon said spherical bearing member for operating said locking means and switch.

2. The combination with a lever provided with a spherical bearing member and a support having a socket for engagement by said spherical bearing member, of a plunger slidably mounted in said support and engageable in said spherical bearing member, an electric switch including a plunger slidably mounted upon said support and engageable in said spherical bearing member, and a member slidably mounted within said spherical bearing member and engageable with said plungers.

3. The combination with a lever provided with a spherical bearing member and a support for said lever including a spherical socket for engagement in by said spherical bearing member, of a spring pressed plunger slidably mounted upon said support and engageable in said spherical bearing member, a second spring pressed plunger slidably mounted upon said support and engageable in said spherical bearing member, said plungers being substantially axially aligned and said second plunger forming part of an electric switch, and a longitudinally slidably mounted key operated pin in said spherical bearing member and located between adjacent ends of said plunger.

4. The combination with a lever, of means engageable with said lever for locking the same, an electric switch, and a member carried by and extending transversely of said lever for operating both said locking means and switch.

5. The combination with a lever, of a plunger slidably engageable with said lever, an electric switch including a plunger also slidably engageable with said lever, and a reciprocable member carried by said lever and arranged to alternatively actuate said plungers.

6. The combination with a lever having a transverse opening therethrough, of a locking plunger slidably engageable in a portion of said opening, an electric switch including a plunger also slidably engageable in a portion of said opening, a reciprocable pin engageable in said opening between said plungers adapted to alternatively actuate the same, and means for yieldably forcing said plungers into said opening.

7. The combination with a lever, of a reciprocable plunger for locking said lever, an electric switch including a reciprocable plunger, and a reciprocable member carried by said lever and engageable with said plungers for alternatively actuating the same.

8. The combination with a support, and a lever having a bearing member adjustably mounted in said support, of a plunger carried by said support engageable with said bearing member for retaining said lever in one position, a pair of electric terminals carried by said support, a second plunger carried by said support, an electric contact member carried by the last-mentioned plunger, and means for alternately actuating said plungers to cause the first-mentioned plunger to release the lever and cause the contact member to engage said terminals.

9. The combination with a support, and a lever having a bearing member adjustably mounted in said support, of a plunger carried by said support engageable with said bearing member for retaining said lever in one position, a pair of electric terminals carried by said support, a second plunger carried by said support, an electric contact member carried by the last-mentioned plunger, yieldable means for moving the last plunger to cause the contact member to engage said terminals and a reciprocating member for alternately actuating said plungers to cause the first-mentioned plunger to release the lever and cause the contact member to be disengaged from said terminals.

10. The combination with a support, and a lever having a bearing member adjustably mounted in said support, of a plunger carried by said support engageable with said bearing member for retaining said lever in one position, a pair of electric terminals carried by said support, a second plunger carried by the last-mentioned plunger, a reciprocating member for actuating both plungers, and key-operated means extending at right angles to said reciprocating member and adapted to actuate the same to cause the first-mentioned plunger to release the lever and cause the contact member to engage said terminals.

11. The combination with a support, and a lever having a bearing member adjustably mounted in said support, of a plunger carried by the support engageable with the lever to lock the same, yieldable means for actuating said plunger, a second plunger carried by the support, electric terminals carried by the support, an electric contact member carried by the second plunger engageable with said terminals, yieldable means for actuating the second plunger, and means carried by said lever between said plungers for moving the same against the yieldable means aforesaid.

In testimony whereof I affix my signature.

ANDREW BACHLE.